2,977,364
PREPARING TRIETHYLENEDIAMINE

Rocco L. Mascioli, Media, Pa., assignor to Houdry Process Corporation, Wilmington, Del., a corporation of Delaware No Drawing. Filed July 17, 1959, Ser. No. 827,725

2 Claims. (Cl. 260—268)

This invention relates to the preparation of the cage compound in which two apex nitrogen atoms are joined by three ethylene groups, as indicated by the formula

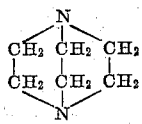

This compound is conveniently called triethylenediamine, but it can be designated as 1,4-diazabicyclo-(2.2.2.)-octane or as 4-azaquinuclidine.

Triethylenediamine was merely of scholarly interest until recently, but many tons of polyurethane foam have now been produced industrially employing triethylenediamine as the principal catalyst. Although A. W. von Hoffman described the concept of triethylenediamine in 1859, he and others had numerous failures in their attempts to synthesize triethylenediamine. Some investigators were of the opinion that the compound was impossible until the successful synthesis by Hromatka in 1942.

Scholarly investigations of the compound are described by Hromatka, Ber. (1942), and by Ishiguro et al., Journal Pharmaceutical Society of Japan (1955). Such scholarly investigations explained that yields of the magnitude of approximately 1% triethylenediamine were attainable in thermal and/or catalytic treatment of amine-hydrohalides, and that recoveries as high as 2% were deemed attractive in view of previous efforts.

The application of E. C. Herrick, Serial No. 628,723 filed December 17, 1956, discloses yields up to 10.1% for a method for the preparation of triethylenediamine by treating alkylenepolyamine vapors over a siliceous cracking catalyst at 300–500° C. Said application also discloses the concept of preparing triethylenediamine by such treatment of monoethanolamine but provides no experimental data thereon.

During the development of the present invention, it was noted that only about 5% triethylenediamine could be obtained by the catalytic treatment of monoethanolamine vapor. However, by employing large proportions of ammonia gas in the reactant gas stream, yields of triethylenediamine greater than 10% were obtained. The reason for the remarkable improvement in yield by such use of ammonia in the reactant stream has not been determined, but the surprising result has been established.

In accordance with the present invention, a great predominance of ammonia is provided in a catalytic zone in which an ethanolamine is converted to form triethylenediamine and by-products. Ammonia is charged to the reaction zone to maintain a mol ratio of at least 3 but not more than 12 mols of ammonia per mol of ethanolamine, while converting the amine to form triethylenediamine.

The nature of the present invention is further clarified by reference to a series of examples.

*Example I*

Monoethanolamine was distilled and the vapors were mixed with 5 mols of ammonia and passed over pellets of kaolin cracking catalyst. The kaolin catalysts are species of the generic class of silica-alumina cracking catalyst. The temperature of the catalytic zone was maintained at an average temperature of 690° F. and the space rate corresponded to 0.37 volume of ethanolamine per volume of kaolin catalyst per hour. The effluent from the catalytic zone was cooled to condense all of the normally liquid and solid materials and to separate normally gaseous components from such effluent. The normally gaseous components thus separated were further cooled to permit the separation of liquid ammonia from gases such as methane, ethane, ethylene, hydrogen and/or other by-products from the reaction. A major portion of the liquid ammonia thus separated was recycled to the step for the preparation of the gaseous mixture consisting essentially of 5 mols of ammonia per mol of ethanolamine. The liquid and solid components separated from the effluent from the catalytic zone amounted to 99% of the weight of the liquid charge. Fractional distillation of such material through a column having the equivalent of 20 theoretical plates at a reflux ratio of 3:1 provided a fraction boiling between 337° F. and 357° F. which was designated as a crude triethylenediamine cut. A technical grade of triethylenediamine was recovered from this crude cut by an appropriate series of procedures including fractional crystallization from normal pentane. The recrystallized triethylenediamine thus recovered constituted 9.6% of the monoethanolamine charge. In a control preparation using no ammonia in the feed, but in all other respects essentially the same as set forth, the yield of triethylenediamine was only about 4%, so that the presence of the ammonia brought about a significant improvement in yield.

*Example II*

Triethylenediamine was prepared following a procedure substantially the same as employed in connection with Example I, except that the space rate was only 0.2 v./v./h. and the average reactor bed temperature was only 675° F. Liquid product recovery was 98% and the product contained 10.6% triethylenediamine. It is possible to obtain a good technical grade of triethylenediamine from the reaction product by any of a variety of recovery and purification procedures.

*Example III*

Catalyst pellets were prepared consisting of synthetic silica-alumina having a Cat-A activity of 45. The mixture consisting of 3 mols of ammonia per mol of monoethanolamine was passed over the catalyst at an 0.3 space rate while maintaining a temperature of about 610° F. in the catalyst bed. The product subjected to fractional distillation weighed 96% of the weight of the charge. Analysis revealed that the triethylenediamine content amounted to 8.8% of the ethanolamine charge. In a series of tests, it was established that by the use of 45 Cat-A activity synthetic silica-alumina catalyst at a temperature about 25° F. lower than employed for kaolin produces results generally comparable to those obtained using kaolin. Such temperature advantage is generally insufficient to justify the greater investment required for the synthetic catalyst.

*Example IV*

Triethylenediamine was prepared by subjecting diethanolamine to the action of kaolin cracking catalyst at an average bed temperature of 650° F. and 0.4 LHSV using 6.5 mols of ammonia as a carrier gas for accelerating the basic reactions in the presence of acidic cracking catalyst. The product contained triethylenediamine corresponding to 7.2% of the diethanolamine fed to the catalyst zone.

*Example V*

Triethanolamine was mixed with 9 mols of ammonia per mol of amine and the mixture was subjected at a temperature of 680° F. at an 0.26 LHSV to the action of a kaolin cracking catalyst. The triethylenediamine content of the product represents approximately 6% of the liquid feedstock.

*Example VI*

A mixture of one mol each of monoethanolamine and triethanolamine was vaporized and the vapors mixed with 5 mols of ammonia. Each such amine corresponds to the general formula $(HOCH_2CH_2)_nH_{(3-n)}N$. The gaseous mixture was passed over kaolin (silica-alumina) catalyst pellets at 0.26 LHSV and about 680° F. The yield of liquid products was 97 wt. percent, comprising triethylenediamine amounting to approximately 5.5% of the liquid feedstock. Similarly a mixture of 3 mols of mono- and 1 mol of di- and 1 mol of triethanolamine was charged to a kaolin packed reactor along with ammonia in the ratio of 4.7 mols of ammonia per mol of mixed alkanolamines. At an average bed temperature of 665° F. and 0.26 space rate, liquid product was obtained amounting to 97% by weight of the amines charged and containing 9.1% by weight of triethylenediamine.

*Example VII*

Monoethanolamine is mixed with 12 mols of ammonia from the recycle line and is passed over synthetic silica-alumina granules (Cat-A activity 30) at a temperature of 740° F. at 2 atmospheres pressure at a space velocity of 2 liquid volumes of monoethanolamine per volume of catalyst per hour. From the effluent from the catalyst zone there is recovered a product containing triethylenediamine in a quantity corresponding to about 6% of the monoethanolamine feed.

*Example VIII*

Monoethanolamine vapors, after mixing with 12 volumes of ammonia, are injected into a bed of 45 Cat-A silica-alumina gel catalyst granules maintained at 560° F. at 0.5 atmosphere absolute pressure. The space velocity is 0.1 volume of liquid monoethanolamine per volume of catalyst bed per hour. The effluent from the catalyst zone contains triethylenediamine in a quantity corresponding to about 6% of the monoethanolamine feed.

By a series of tests, it is established that the catalyst must be an inorganic acidic cracking catalyst, preferably kaolin cracking catalyst. The space velocity must be from 0.1 to 2 volumes of liquid reactant per volume of catalyst per hour. The catalyst may be a fixed bed, fluidized bed, or suspended in the gas stream. The catalytic zone must be maintained at an absolute pressure within the range from 0.5 to 2 atmospheres, and at a temperature within the range from 550° F. to 750° F. Of particular importance, ammonia must be present in a mol ratio of at least 3 but not more than 12 mols of ammonia per mol of $(HOCH_2CH_2)_nH_{(3-n)}N$, whereby the triethylenediamine in the product constitutes at least 5% by weight of the monoethanolamine, diethanolamine and/or triethanolamine feedstock.

Obviously many modifications and variations of the invention as hereinbefore set forth may be made without departing from the spirit and scope thereof, and therefore only such limitations should be imposed as are indicated in the appended claims.

What is claimed is:

1. The method of preparing triethylenediamine which includes the steps of: preparing a gaseous mixture consisting predominantly of $(HOCH_2CH_2)_nH_{(3-n)}N$ wherein $n$ is an integer less than 4 and ammonia, the molar ratio of ammonia to amine being within the range from 3 to 1 to 12 to 1; passing said mixture at a space velocity of from 0.1 to 2 volumes of liquid amine per volume of catalyst into contact with acidic cracking catalyst particles maintained at a temperature within the range from 550° F. to 750° F.; withdrawing effluent vapors from the catalyst particles, said vapors containing a quantity of triethylenediamine constituting at least 5% of the amine charged to the catalyst; separating all normally gaseous components from said effluent to provide a residue of normally liquids and solids; separating ammonia from said gaseous components and directing at least a portion thereof to said preparation of the gaseous mixture; and subjecting said residue to fractional distillation to prepare a distillate containing triethylenediamine.

2. In the method wherein a gaseous mixture containing $(HOCH_2CH_2)_nH_{(3-n)}N$ wherein $n$ is an integer less than 4 as the predominant organic component is converted to an organic mixture product comprising triethylenediamine, the improvement which includes the combination of conducting said conversion in the presence of acidic cracking catalyst particles, maintaining the temperature within the range from 550° F. to 750° F., and recycling ammonia to the conversion so that the feedstream to the conversion contains at least 3 but not more than 12 mols of ammonia per mol of $$(HOCH_2CH_2)_nH_{(3-n)}N$$

whereby said product of the conversion contains at least 5% triethylenediamine.

References Cited in the file of this patent

Ishiguro et al.: Jour. Pharm. Soc. (Japan), vol. 75, pp. 674–677 (1955).